(12) United States Patent
Teufel et al.

(10) Patent No.: US 6,243,503 B1
(45) Date of Patent: Jun. 5, 2001

(54) DATA ACQUISITION DEVICE FOR OPTICAL DETECTION AND STORAGE OF VISUALLY MARKED AND PROJECTED ALPHANUMERICAL CHARACTERS, GRAPHICS AND PHOTOGRAPHIC PICTURE AND/OR THREE DIMENSIONAL TOPOGRAPHIES

(75) Inventors: Thomas Teufel, Spaichingen; Gerhard Keller, St. Leon-Rot, both of (DE)

(73) Assignee: MM-Lesestift Manager Memory GmbH, Spaichingen (DE)

( * ) Notice: Subject to any disclaimer, the term of this patent is extended or adjusted under 35 U.S.C. 154(b) by 0 days.

(21) Appl. No.: 09/202,978

(22) PCT Filed: Jun. 17, 1997

(86) PCT No.: PCT/DE97/01265

§ 371 Date: May 7, 1999

§ 102(e) Date: May 7, 1999

(87) PCT Pub. No.: WO98/00965

PCT Pub. Date: Jan. 8, 1998

(30) Foreign Application Priority Data

Jun. 27, 1996 (DE) .............................................. 196 25 767

(51) Int. Cl.[7] ...................................................... G06K 9/20
(52) U.S. Cl. .............................................................. 382/312
(58) Field of Search ................................... 382/312–324; 345/165, 166; 235/234–236, 385, 454–456, 460–463, 467, 470, 472; 358/473, 474, 478, 493, 494

(56) References Cited

U.S. PATENT DOCUMENTS

| | | | |
|---|---|---|---|
| 4,349,730 | * | 9/1982 | Pfeifer et al. ........................ 235/472 |
| 4,510,390 | * | 4/1985 | Rajchman ............................ 250/341 |
| 4,523,235 | * | 6/1985 | Rajchman ............................ 358/256 |
| 4,887,165 | * | 12/1989 | Sato et al. ............................ 358/474 |
| 4,899,228 | * | 2/1990 | Sano et al. ........................... 358/473 |
| 4,906,843 | * | 3/1990 | Jones et al. .......................... 250/221 |
| 4,947,261 | * | 8/1990 | Ishikawa et al. .................... 358/473 |
| 5,012,349 | * | 4/1991 | De Fay ................................ 358/296 |
| 5,115,227 | * | 5/1992 | Keiji .................................... 340/709 |
| 5,172,243 | * | 12/1992 | Hayashi et al. ..................... 358/400 |
| 5,301,243 | * | 4/1994 | Olschafskie et al. ............... 382/313 |
| 5,412,205 | * | 5/1995 | McVicar et al. .................... 250/234 |
| 5,574,804 | * | 11/1996 | Olschafskie et al. ............... 382/313 |

* cited by examiner

*Primary Examiner*—Jose L. Couso
(74) *Attorney, Agent, or Firm*—Collard & Roe, P.C.

(57) ABSTRACT

The data acquisition device comprises a projecting device for projecting the light emitted by a radiation source onto a section of a marked surface, and an optical unit for recording and reproducing the reflected light on a screen sensor converting the reflected light into a sequence of electronic signals. Furthermore, the data acquisition device has a motion detector for generating synchronizing signals in the presence of a movement parallel with the marked surface, as well as a signal processing unit converting the signals of the screen sensor into information packets containing independently of the character code the alphanumerical, graphic or pictured information of a freely selectable part of the marked surface, and recallably storing such information packets in a memory unit.

39 Claims, 13 Drawing Sheets

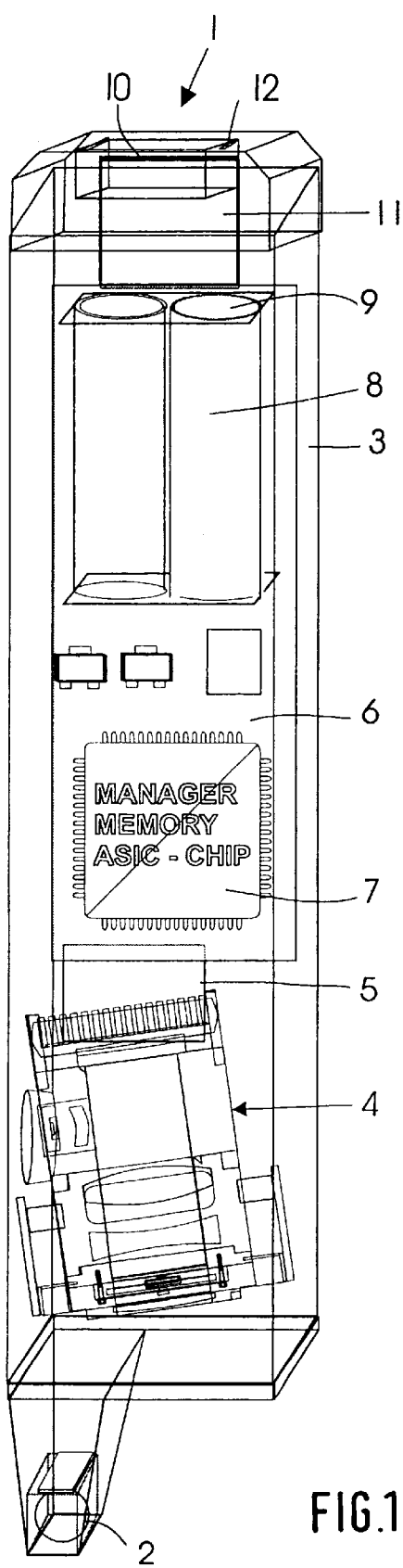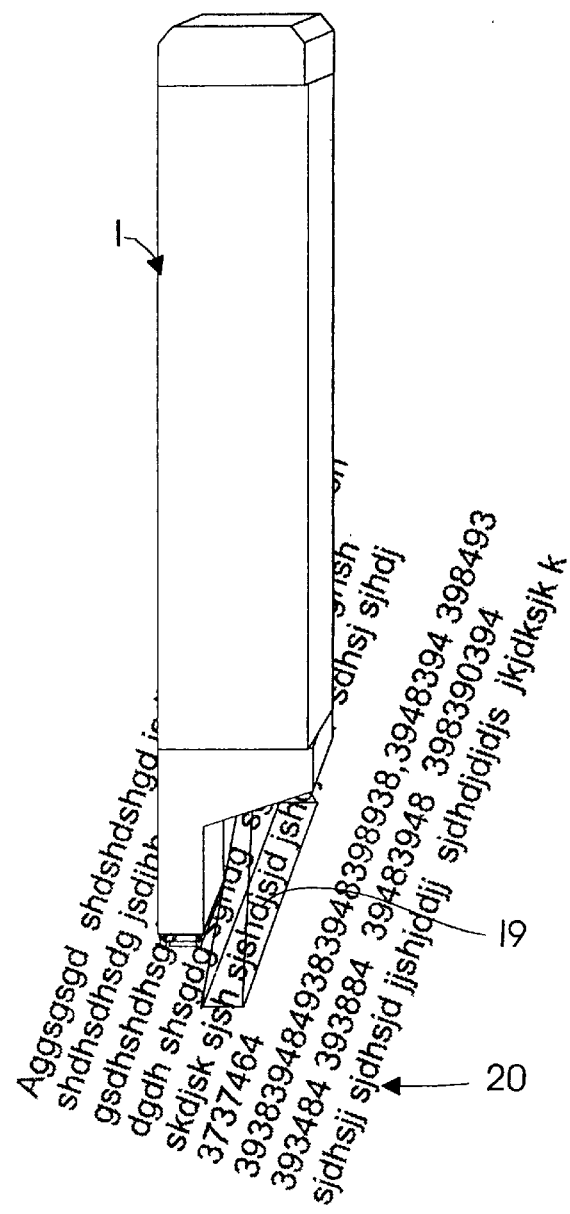
FIG.1
FIG.2

Hall-Effect

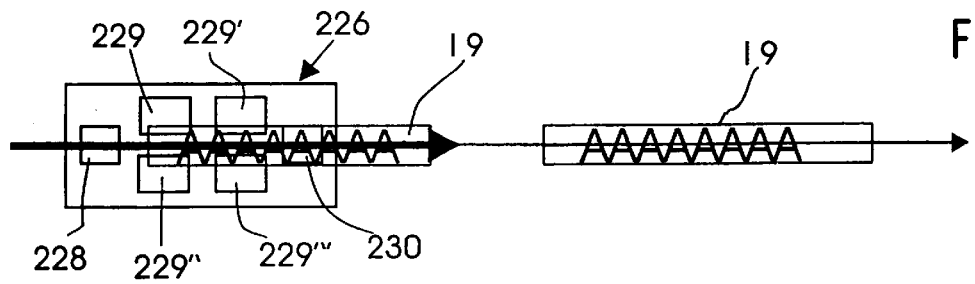
FIG. 19 A
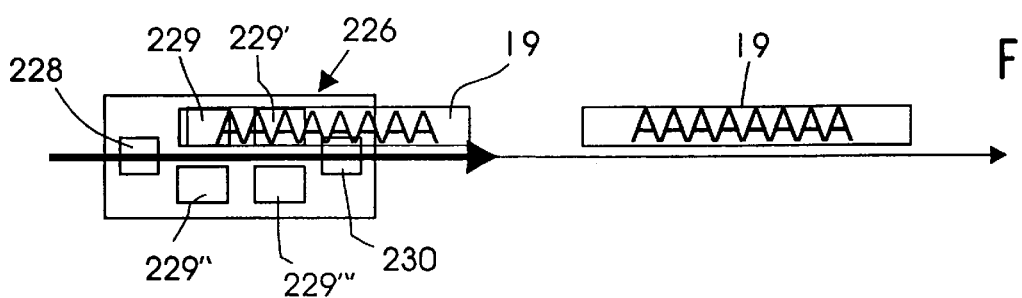
FIG. 19 B
FIG. 18 A
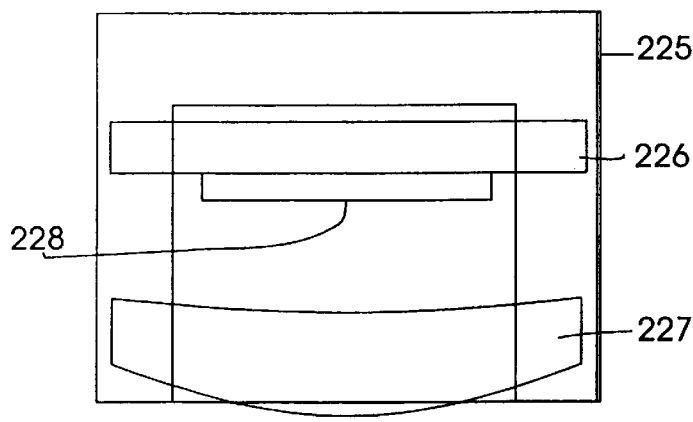
FIG. 18 B
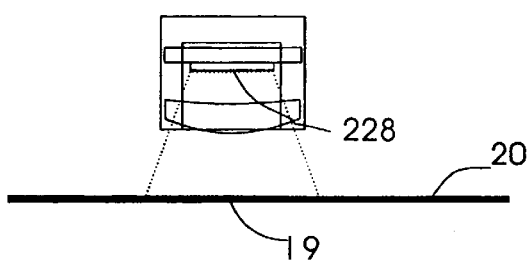

;# DATA ACQUISITION DEVICE FOR OPTICAL DETECTION AND STORAGE OF VISUALLY MARKED AND PROJECTED ALPHANUMERICAL CHARACTERS, GRAPHICS AND PHOTOGRAPHIC PICTURE AND/OR THREE DIMENSIONAL TOPOGRAPHIES

BACKGROUND OF THE INVENTION

A scanner for the electronic acquisition and storage of alphanumerical characters is already known from document WO 92/11610. With such devices, the light of a radiation source is projected via a projection device onto a predeterminable detail of a surface marked with alphanumerical characters and the reflected light is reproduced via an optical unit on an image sensor converting the light into a sequence of electronic signals. A motion detector registers at the same time the motion of the scanner along a line of characters. A signal processing electronics integrated in the reading device converts the signals into a sequence of characters each corresponding with alphanumerical symbols. The characters can be stored as alphanumerical symbols in an integrated memory or transmitted via an interface to a computer for further processing.

Such scanners are limited to acquiring and storing alphanumerical characters line by line but are not capable of acquiring graphic representations or photographic pictures.

SUMMARY OF THE INVENTION

Furthermore, a hand-held scanner in the form of a reading pen for reading in characters is known from international application WO 94/00825. For this purpose, the reading pen is moved line-by-line across lines of characters. In this process, at least part of the line is illuminated and the reflected light is captured and converted into digital information, only information representing a character or the end of a character being recorded. This information is subsequently supplied to a character recognition device and finally stored, e.g. in an ASCII text file.

This hand-held scanner has the drawback that it is possible only to read-in characters corresponding with the preset recognition pattern. Reading-in pictured information not structured alphanumerically is not possible.

A hand-held copying device that became known earlier from European patent application EP 0 278 004 does not have the above drawback. This device first picks up the entire information available in the plane of a picture and files it almost unprocessed in a matrix data memory.

However, this device, too, is designed only for time-oriented data acquisition. This has the drawback that a text arranged, for example, in a curve can be acquired only by gathering a substantially quadrangular detail covering the entire region of the curve, which means that an amount of data not of interest for the predominating part is always jointly acquired and filed.

Therefore, the invention is based on the problem of creating a data acquisition device permitting memory-optimized acquisition of any desired information available in the plane of a picture free of any direction of motion preset for such acquisition.

This problem is solved by a data acquisition device with the features of claim 1 or claim 26.

When employed as intended, the data acquisition device as defined by the invention acquires in an optical manner a freely selectable part of an image plane marked with alphanumerical characters, graphics or photographic images, and converts the optical signals into a sequence of electronic signals, which are stored in a manner accessible to further electronic processing with retention of the complete original pictured information, and which can be recalled. An "OCR" (Optical Character Recognition) text search software thus can be dispensed with.

Illumination usefully should take place with monochrome light in order to avoid distortion of the optical acquisition due to dispersion. Infrared light is particularly suitable in this connection because it has greater depth of penetration than visible light on marked surfaces usually employed such as, for example, white paper, so that it permits distinguishing the information to be acquired from impurities.

So as to allow variable adjustment of the image plane section or segment to be acquired, it is useful if a projection device having a shutter with a variable aperture is mounted on the data acquisition device. Particularly suitable for this purpose is a slotted shutter whose slot size is infinitely variable and permits acquisition of a beam-like detail.

In the interest of a simple structure of the data acquisition device provision is made according to a useful further development of the invention that the radiation source is integrated in the image sensor, so that the light of said source is guided through the same optical channel as the reflected light.

Particularly simple handling is obtained if the motion detector is connected with the data acquisition device in a fixed manner, and if said detector has a scanning element which is designed rotation-symmetric and which is arranged on the motion detector in such a way that it is rotatable about at least one axis as well as guidable along the area to be acquired.

Detection of the movement of the data acquisition device on the section usefully can take place with the help of the Hall-effect. To this extent, provision is made according to another important further development of the invention that the motion detector has a Hall-element with a scanning element, whereby the scanning element is surrounded by an inhomogeneous magnetic field. The rotary motion of the scanning element causes a periodic change in the Hall-voltage induced in the Hall-element. Said effect permits the determination of the position of the data acquisition device on the section.

According to another further development the scanning element consists of a sphere supported in a freely rotatable way and having magnet platelets arranged on its surface, such small plates being equally spaced from each other. The movement of the data acquisition device on the section can be detected in this way both in the horizontal and vertical directions.

In another embodiment, the data acquisition device is provided with an electronic closure, through the actuation of which it is possible to freely determine that part of the section which is to be filed by the signal processing unit in an information packet.

For more rapid information processing it is possible to integrate the one or more memories intended for receiving the information packets in the signal processing unit.

In yet another embodiment the signal processing unit may have devices for connecting external memories. It is possible in this way to store also comprehensive texts or complex pictured documents.

The current uptake and the operating voltage can be clearly reduced if the signal processing unit and the memory unit are already integrated in the image sensor.

For external further processing of the data it is useful if the signal processing unit and/or the memory unit of the data acquisition device are optically, electronically or opto-electronically connected to an interface for transmitting data to external devices.

For easier handling, the data acquisition device should be equipped with a battery current supply which usefully can be operated with rechargeable batteries. The current infeed for charging the batteries takes place either via a slide-in device that is detachable from the data acquisition device, or via a cable connected to the interface. The process for charging the batteries can be optimized also by integrating a charging electronics preferably in the computer interface card subjecting the charging process to continuous electronic control.

Furthermore, advantageous is also the possibility of continuously controlling the acquired or stored data. According to a further embodiment of the invention, a monitor may serve for this purpose, such monitor being controlled by a signal processing chip integrated in the signal processing unit. Thus the acquired image information can be visually displayed online. However, it is possible also to call in all information packets which were filed in the memory unit and which are visible as readable image representation. The monitor can be designed in this connection also as a slide-in unit which, when required, can be connected to the reading device, or also can be separated from the latter.

The low space requirements of modern microelectronics permit the particularly useful embodiment of the invention as a manual device, for example in the form of a fountain pen.

According to yet another embodiment of the invention, the characters, graphics or images to be acquired are marked with a beam of visible light and a superimposed beam of infrared light congruent with the former. The reflected light bundle is decomposed into its visible and infrared components by a semitransparent mirror, which is permeable only to infrared light, whereby only the infrared light components are used for image acquisition.

Such infrared light image acquisition has the advantage that it is still possible for the image sensor to process and utilize even soiled or blurred characters. Furthermore, the image sensor is capable of acquiring also characters in the color of the visible light used for the marking.

In another embodiment, the data acquisition device has a motion detector permitting contact-free acquisition of the movement of the data acquisition device parallel with the section. This is particularly advantageous if the section does not readily permit detection of motion, for example by means of a scanning sphere, for example in case of a relief-like surface structure, or in case of surfaces which are sensitive to touching. Optical sensor devices can be considered in this connection as contact-free acquisition means; however, other possibilities are conceivable as well, for example such as acquisition of the motion by means of sound waves or magnetic fields.

According to claim 27, provision is made for photodiodes as particularly advantageous means for acquiring the motion, which detect the light of radiation source reflected by the selected section. In this connection, the radiation source may be the one used also for recording the image; however, a separate radiator for detecting the motion is conceivable as well. During movement of the data acquisition device, the photodiodes are arranged in a substantially parallel data acquisition plane with regard to the selected section in such a way that due to the time sequence of the electric signals supplied by the photodiodes, it is possible to clearly allocate the movement performed by the reading device device vis-a-vis the marked surface. In order to detect in this manner any motion parallel with a surface it is necessary to space the photodiodes in the plane in at least two different directions. The signals emitted by the photodiodes can be used at the same time as reference signals in order to carry out a correction-compensation, for example in order to assure line-correct acquisition of texts.

The motion detector advantageously has means for detecting the vertical spacing of the data acquisition device from the selected section. The vertical spacing is preferably measured in the optical or infrared-optical manner, for example by means of one or a plurality of photodiodes which detect the light reflected by the section. In this case, too, provision can be made for a separator radiator for measuring the vertical spacing; however, it is conceivable also to employ for this purpose the radiation source used for detecting the motion and/or for the recording of the image.

In the further developed embodiment according to claim 29, it is no longer required to maintain the data acquisition device at a constant spacing relative to the section. In this further developed embodiment, the focal length of the focusing unit is adjusted in dependence upon vertical spacing of the data acquisition device from the selected section—said vertical spacing being detected by a suitable measuring instrument—in a way such that the selected section is always reproduced on the image sensor at any vertical spacing.

In another advantageous further developed embodiment the radiation source employed for the detection of the motion and/or the vertical spacing is integrated in the motion detector. A semiconductor radiator is preferably employed as such a radiation source, which is favorable in terms of manufacturing cost and which is saving space and energy when used.

In yet another advantageous further developed embodiment, the means for detection the movement and/or the means for detecting the vertical spacing and/or the radiation source, for example a semiconductor radiator, are integrated in a microchip, which is arranged in the motion detector.

According to claim 32, the signals emitted by the means for detection of the motion and/or the means for detecting the vertical spacing are converted into digital synchronizing signals, which are stored in the memory of the data acquisition device together with the information packet of the simultaneously recorded image information. In this way, true-to-scale and correct reproduction of the pictured information is possible also when transmitting the data to an external device such as, for example a PC.

In a further developed embodiment according to claim 33, the data acquisition device is suitable for acquiring three-dimensional information. For this purpose, the image sensor has suitable means permitting detection of a three-dimensional character of objects. Such means may be of, for example the stereoscopic or holographic type.

As a particularly advantageous means for detecting the three-dimensional character of objects, provision is made according to claim 34 for an image sensor having two detector matrices which each are sensitive only in a spectral section of the frequency spectrum emitted by the radiation source of the optical unit of the reading device, namely in a way such that the two sections do not overlap each other spectrally. For three-dimensional detection, the two detector matrices are controlled shifted in time, for example by means of a bistable switch, and the different image information of the two detector matrices is converted in a suitable data processing device into information about the three-dimensional structure of the selected section.

In another further developed embodiment, the data acquisition device according to claim 35 has a transmitting and receiving unit, by means of which wireless communication is possible with an external computer.

So that also hand-written information can be converted into EDP-readable information, the signal processing unit is exchanging data with a memory medium containing corresponding reference information. For example, hand-written information can be filed in this way in the image memory as standardized hexadecimal code characters.

In yet another advantageous further developed embodiment, the data acquisition device is provided with an input unit, for example a keyboard, by means of which it is possible to call up or input information about selectable processing programs such as text, chart or graphic programs.

In another advantageous embodiment, the data acquisition device consists of at least two separate and functionally autonomous units. One reading unit serves for acquiring the information contained in the selected section. By means of preferably remote wireless data transmission said information is transmitted to a processing unit by means of which the read-in data are processed. The processing unit in turn may be divided in functionally autonomous units, for example a control unit and an indicating unit. Such a design facilitates handling of the data acquisition device. In particular, the reading unit can be designed in the form of a small-volume and lightweight hand-held data acquisition device owing to the fact that it is possible to dispense with the installation of data processing hardware and the cooling systems etc. necessarily connected therewith.

The control unit of the aforementioned data acquisition device is usefully provided with sensor means for the input of control commands or other information. Using a so-called touch pen it is possible in this way to employ the reading device as a keyboardless pocket PC. As touch pens it is possible to consider, for example a correspondingly designed read-in unit.

In a further developed embodiment, the read-in unit is designed at the same time as a writing tool and permits the processing of information previously written by hand with the read-in means.

For explaining the invention in greater detail, an exemplified embodiment is described in the following by reference to the attached drawings showing the following by schematic representations:

BRIEF DESCRIPTION OF THE DRAWINGS

FIG. 1 shows the structure of a data acquisition device designed in the form of a hand-held device, with a motion detector, an optics, a signal processing unit, an integrated battery supply unit, and an integrated interface.

FIG. 2 shows a view of data acquisition device 1 when used as intended.

FIG. 18 shows a longitudinal section through the contact-free motion detector represented in FIG. 17.

FIG. 19 shows the mode of operation of the detecting means of the motion detector shown in FIG. 18 by block representations.

FIG. 22 is a read-in unit;

FIG. 23 is a control unit; and

FIG. 24 is an indicating unit of such a data acquisition device.

DETAIL DESCRIPTION OF THE INVENTION

Figure 3:
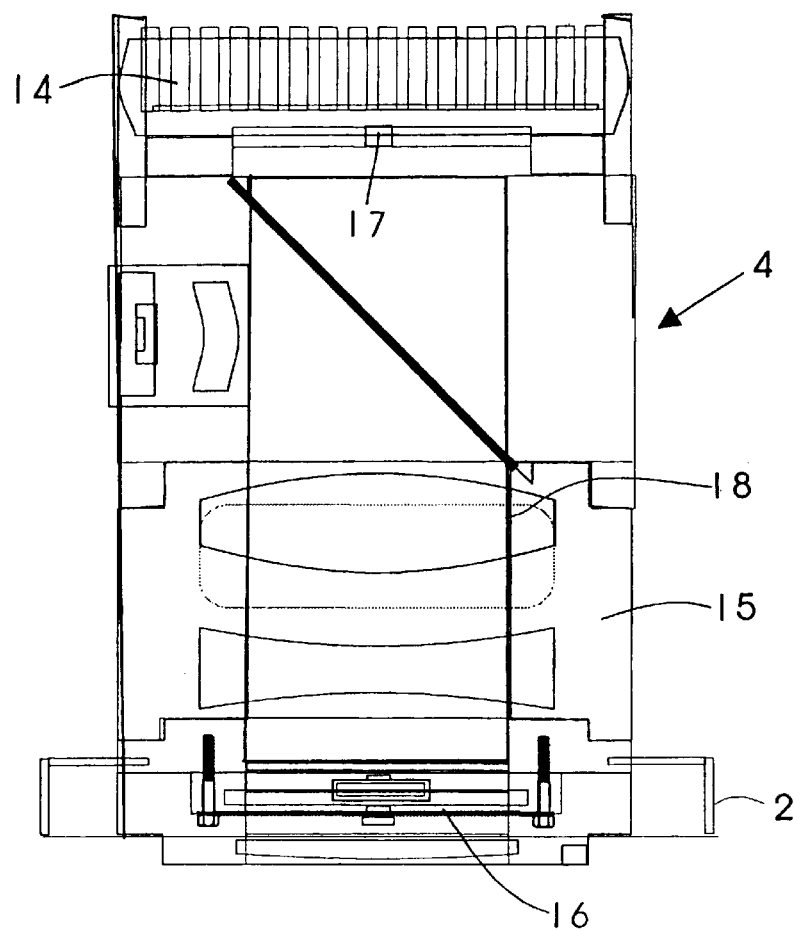
FIG. 3 shows a longitudinal section through the optics of the data acquisition device consisting of an image sensor, a focussing unit and a slotted shutter.
Figure 4:
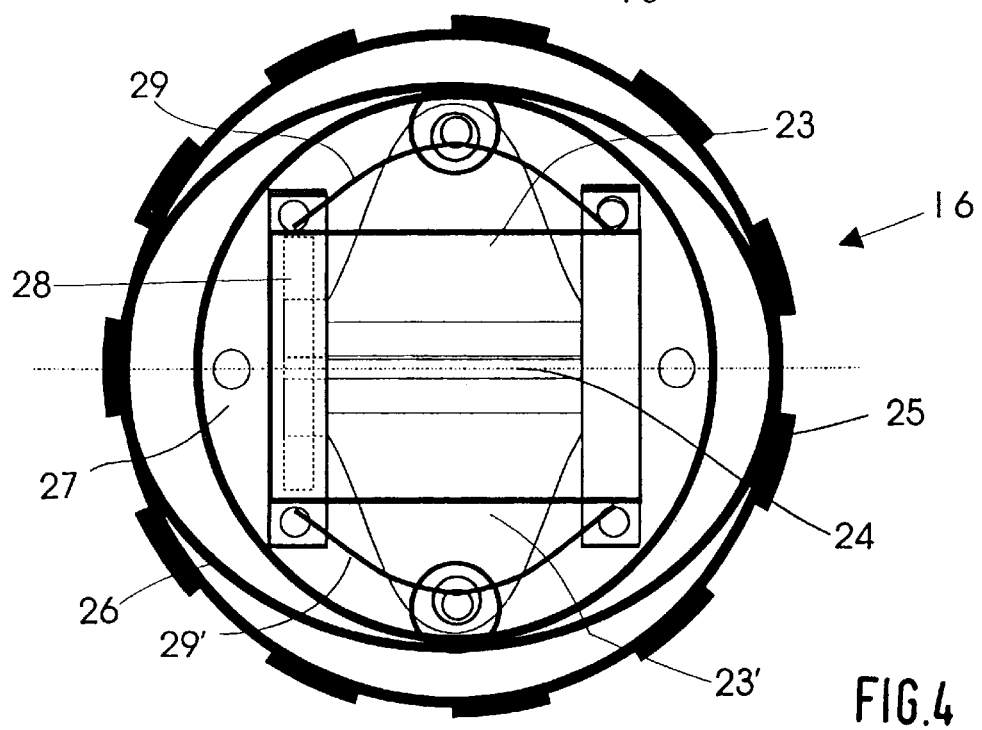
FIG. 4 is a top view of the slotted shutter of the optics.
Figure 6:
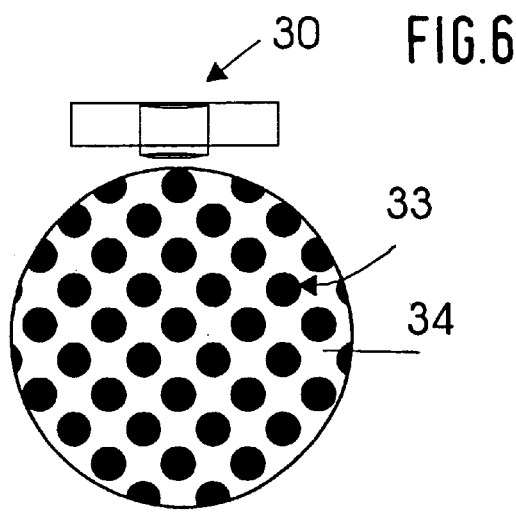
FIG. 6 shows a sectional view of the structure of a motion detector designed as a Hall-generator.
Figure 5:
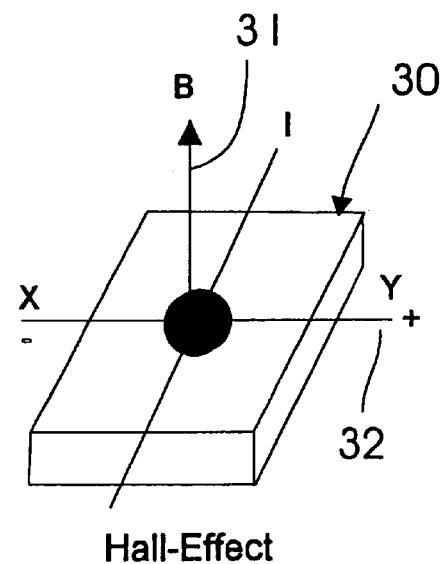
FIG. 5 is a general sketch explaining the so-called Hall-effect.
Figure 7:
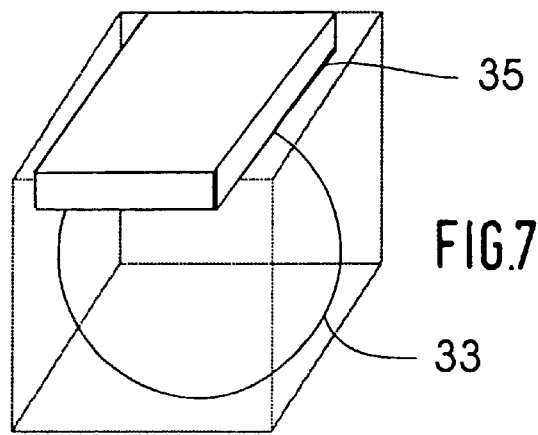
FIG. 7 is a perspective view of the motion detector designed as a Hall-generator unit.
Figure 8:
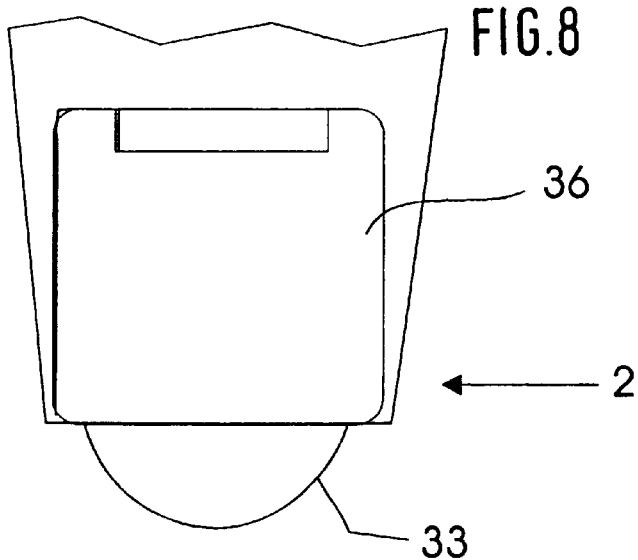
FIG. 8 is a side view of the motion detector.
Figure 9:
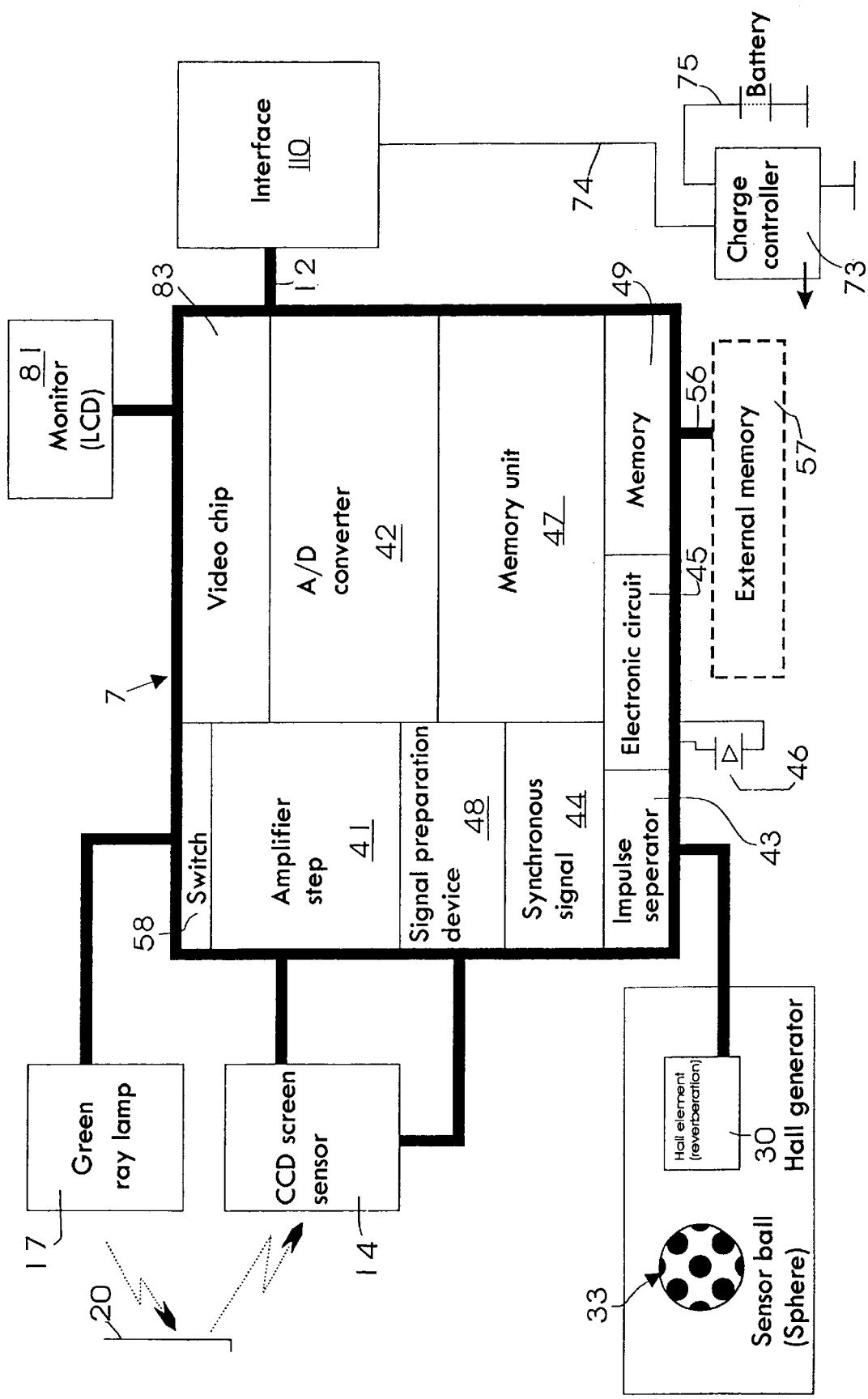
FIG. 9 shows the schematic structure of the data acquisition device in a block diagram.

The data acquisition device 1 shown in FIG. 1 comprises a motion detector 2 solidly joined with said reading device, said motion detector projecting from a housing 3 designed as a handle. Integrated in housing 3 are an optics 4 serving for image acquisition, a board 6 connected to optics 4 via a multi-core connection cable 5, with a signal processing unit 7 and a battery supply unit 8 with chargeable batteries 9 being arranged on said board; furthermore, an interface 10, which is electronically connected to board 6 via a connection cable 11; and an interface card 12.

Optics 4, which serves for image acquisition, consists of a CCD image sensor 14, which converts optical image signals into electronic image signals, and in which a semiconductor radiator 17 is integrated, said radiator radiating, for example green light. A projection device 15 with an optical focusing unit 18 is arranged on image sensor 14. Focusing unit 18 consists of one biconvex, one plane-concave and one biconcave lens, as well as of a slotted shutter 16, which is arranged on the side of projection device 15. When the data acquisition device is employed as intended, said projection device is faced by the information carrier carrying the information to be acquired. Slotted shutter 16 has two lamellae 23, 23', which form a slot 24 which is variably adjustable via a rotatable adjustment ring 25. For adjusting the slot, the slot lamellae 23, 23', which are guided in the radial direction along two guide rails 28 arranged on a circular disk 27 connected in a fixed way with projection device 15, each are pressed by a radially outwardly directed force of a spring 29, 29' joined fixed with guide rails 28 against an elliptic framing 26 connected fixed with adjustment ring 25. Elliptic framing 26 is designed in this connection in such a way that slot 24 is completely closed when the lamellae 23, 23' are arranged with their guiding device parallel with the small semi-axis of the ellipse formed by framing 26. A rotation of adjustment ring 25 causes the slot lamellae 23, 23' to be forced apart, enlarging the slot 24. A maximal slot size is reached with an adjustment in which the lamellae 23, 23' are arranged with their direction of guidance parallel with the large semi-axis of the ellipse formed by the framing 26.

Due to the cooperation of focusing unit 18 with slotted shutter 16 it is possible to illuminate with the light of semiconductor 17 a freely selectable section 19 of an image plane 20 having information to be acquired, such section approximately having the shape of a rectangular beam, when the data acquisition device is used as intended and guided in the manner shown in FIG.2 along an image plane 20 provided with alphanumerical characters, graphics or photographic images. The light reflected by the section 19 and projected by the focusing unit onto image sensor 14 after it has passed through slotted shutter 16 is converted by said image sensor 14 in a manner known per se and not of interest here in detail into electronic signals.

In order to be able to detect a larger section of an image plane 20 provided with information, it is necessary that a motion detector 2 detects the movement of reading device 1 along the marked surface and transmits corresponding synchronizing signals to signal processing unit 7. What is involved in this connection with the data processing device shown in FIG. 1 is a motion detector 2 exploiting the so-called Hall-effect for detection purposes. A Hall element 30 in the form of a conductor conducting a flow of current is penetrated in this connection by a magnetic field 31. The action of the magnetic field 31 on the flow of current in Hall element 30 leads to a voltage 32 transversely to the direction in which the current flows through said element.

On the side facing the image plane 20, motion detector 2 has a scanning sphere 33 supported in a freely rotatable way, with small magnet platelets 34 being arranged on the surface of said sphere with equal spacing between each other. The movements of scanning sphere 33 versus a Hall element 30, which is arranged connected fixed with data acquisition device 1 and spaced from scanning sphere 33 lead to a periodic change in the magnetic field 31 penetrating Hall element 30 and thus to a correspondingly periodic change in the voltage in Hall element 30. So as to be able to detect the two-dimensional motion of scanning sphere 33, two Hall elements 35, 36 are required, which are arranged spaced from scanning sphere 33 and vertically relative to each other, and which each are passed by a flow of current in such a way that voltage signals emitting from said Hall elements permit a clear conclusion with respect to a defined rotary motion of scanning sphere 33.

Figure 10:
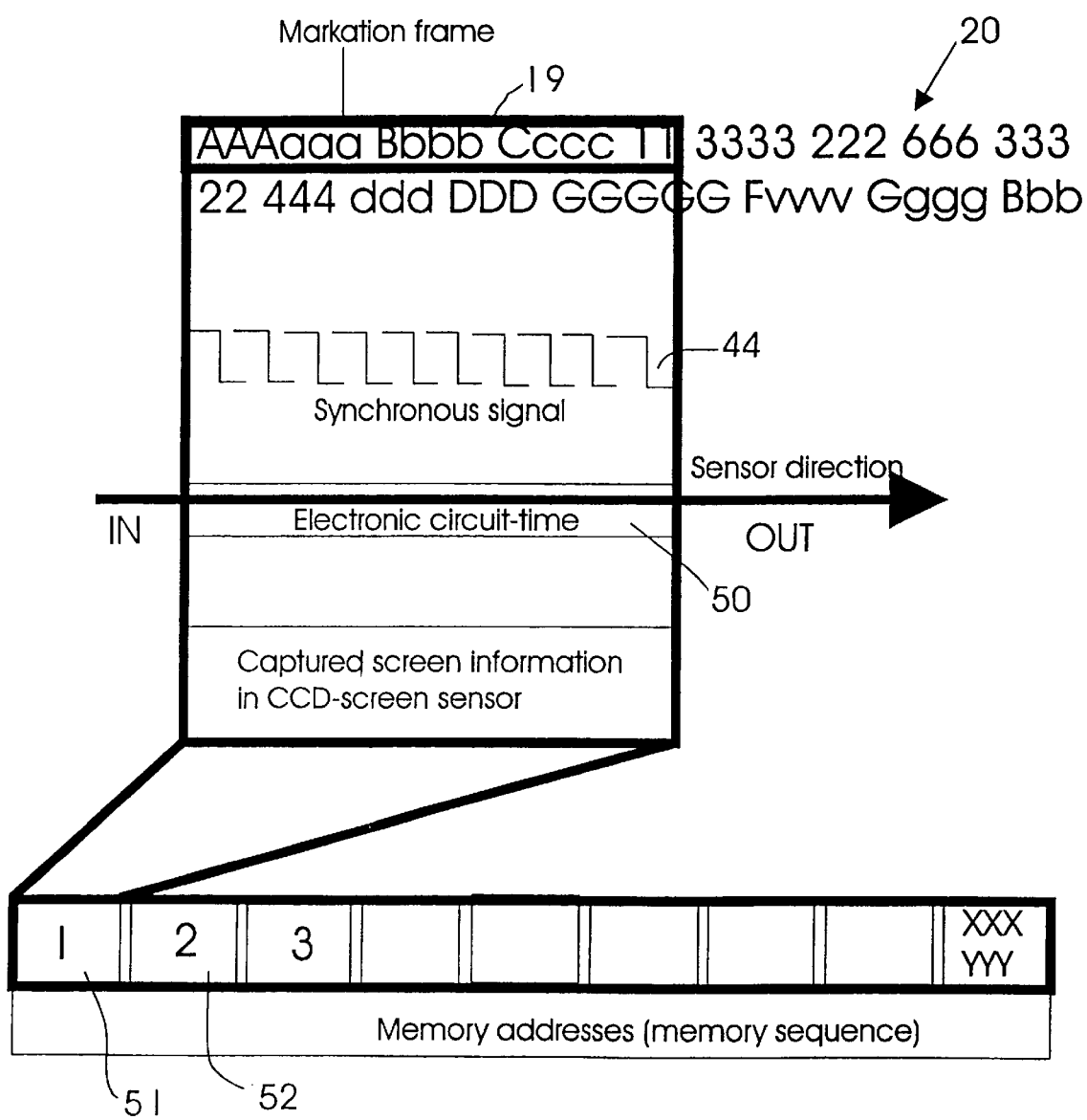
FIG. 10 shows with the help of a block diagram the read-in and storing of information by means of the reading device.

The electronic image signals of image sensor 14 and the signals of Hall element 30 are supplied to signal processing unit 7. The image signals are electronically amplified in an amplifier stage 41 and supplied to an A-D converter 42 and stored in the digital form in a memory unit 47. The signals of Hall element 30 are converted into synchronizing signals 44 in a pulse divider 43. An electronic closure 45 determines the start and the end of the sequence of the synchronizing signals 44 and thus the size of the image section 19 of image plane 20 to be detected. As shown in FIG. 10, the synchronizing signal 44 limited in this way by the electronic closing time 50 is supplied to a signal editing unit 48 together with the image signals called in from memory unit 47, and converted into a digital information packet 51, which is stored under a memory address 52 of a memory 49. Devices 56 attached to memory 49 permit extension of the storage capacity by connecting additional external memories 57.

Figure 11:
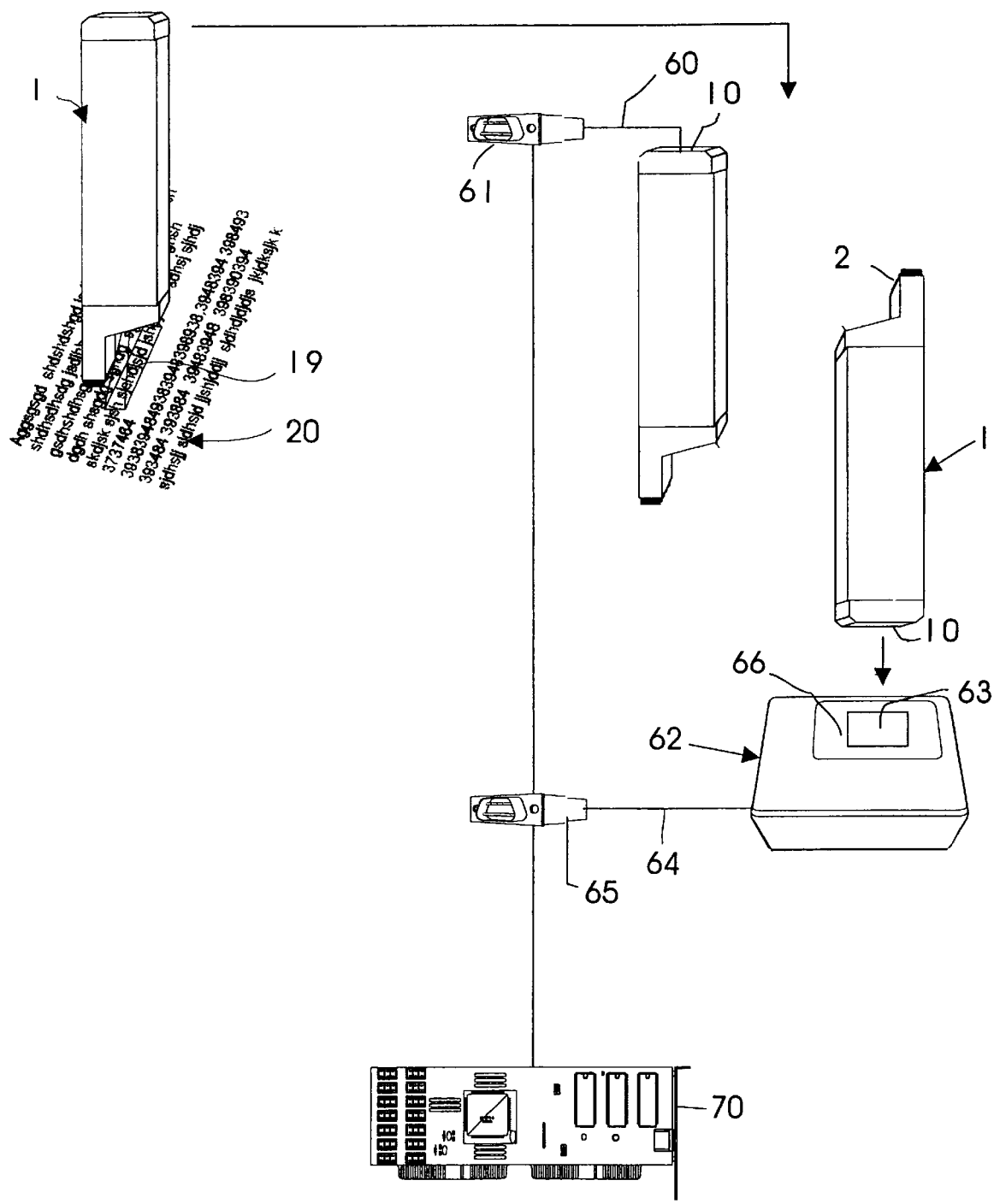
FIG. 11 shows with the help of a general sketch the transmission of the data acquired by the data acquisition device to an electronic data processing installation.

In the embodiment of data acquisition device 1 shown in the drawing, signal processing unit 7 is connected to interface 10 via a cable 11, said interface permitting tie-up with external electronic data processing equipment. As shown in FIG. 11, this is accomplished either via an interface cable 60, which is directly connectable with interface 10 to an external electronic data processing installation 70 via a plug 61, or via a slide-in device 62, in which data acquisition device 1 can be positively but detachably received in a recess 63, and which device has a connecting device 66 fitting interface 10, as well as connected via an interface cable 64 and a plug 65 to an external data processing installation 70.

In the housing 3 designed as a handle, data acquisition device 1 has a battery current supply unit 8 arranged on the board 6, which supplies all of the current required for operating data acquisition device 1, and which is preferably operated with rechargeable batteries 9. Batteries 9 are chargeable via the slide-in device 62 or via interface cable 60, whereby said batteries are monitored by a charging electronics located on an interface card 72. A voltage controller 73, which is connected via connecting cables 74, 75 to interface 10 and battery unit 8, generates the required operating and control voltages for operating the electronic components, and monitors and controls the voltage of batteries 9.

Figure 12:
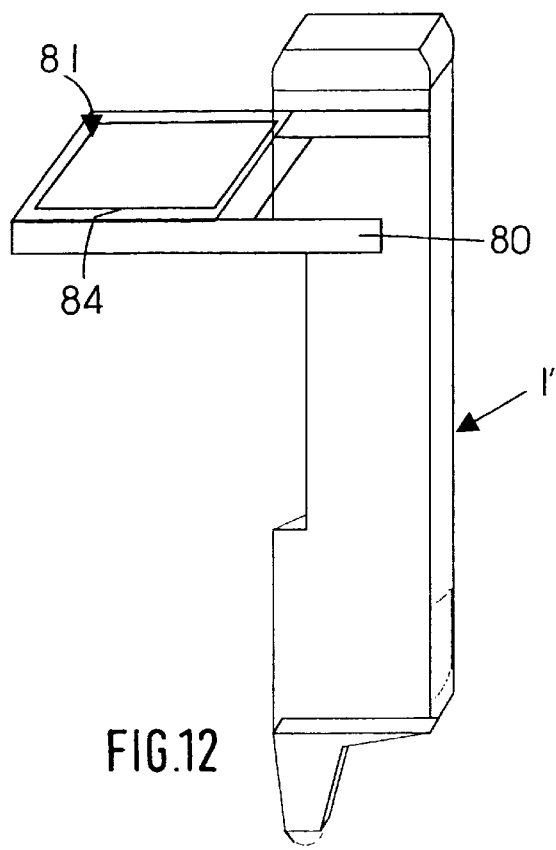
FIG. 12 is a perspective view of a data acquisition device with a monitor devised as a slide-in unit in its operating condition.
Figure 13:
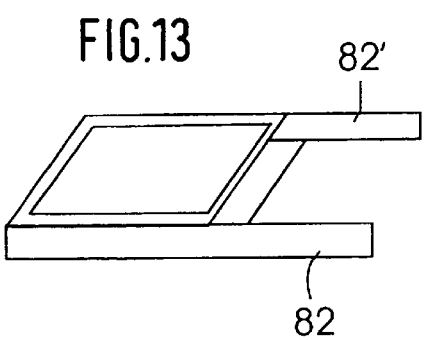
FIG. 13 is a perspective view of the monitor slide-in unit by itself.
Figure 14:
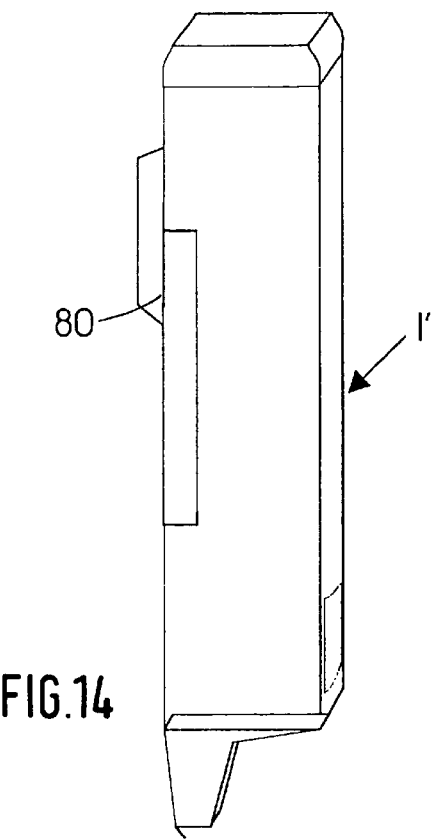
FIG. 14 also is a perspective view of the data acquisition device according to FIG. 12 with the monitor slide-in unit in its non-operating condition.

FIG. 12 shows an embodiment of a data acquisition device 1' which is modified versus the embodiment according to FIG. 1. Said data acquisition device 1' has a device 80, in which a monitor 81 in the form of a slide-in unit can be inserted via the connecting elements 82, 82' for a mechanically fixed yet detachable as well as electronic connection with data acquisition device 1'. Monitor 81 is controlled via a video chip 83 integrated in signal processing unit 7. Said video chip accesses the information packets 51 filed in memory addresses 52 and permits their representation on a display 84 arranged on LCD-monitor 81.

What is involved with the data acquisition device explained in the aforegoing is that the radiation emitted by semiconductor radiator 17 in the visible sunlight spectral range is projected via protection device 15 and slotted shutter 16 onto the medium to be detected and becomes visible, for example as beam 19 or frames. The geometric dimensions of the projected beam or frame are determined by the adjusted slot size of the slotted shutter infinitely adjustable with adjustment ring 25. This means that not only the projected position beam 19 is adapted to the size of the font or graphics to be detected, but the optical detection range for image processing in the CCD-image sensor is defined as well. The projected light rays are reflected by the irradiated section 19 of image plane 20 and are received by CCD-image sensor 14 in the reverse direction via the slotted shutter present in the light path and via the optices as reflected rays containing all of the image information of the respective section 19. In the representation of the medium size to be detected by means of a monitor 81, the visual representation exactly corresponds with the image information detected by the CCD-image sensor 14.

The pulses for the CCD-synchronous signal are generated by the Hall generator consisting of Hall element 30 and scanning sphere 33, and supplied to signal processing unit 7 via converter stage 42. The magnetic field 31 required for the Hall-effect is generated by magnet platelets 34, which are arranged evenly distributed directly under the surface of scanning ball 33. The control pulse for electronic closure 45 is supplied via a key 46.

Figure 15:
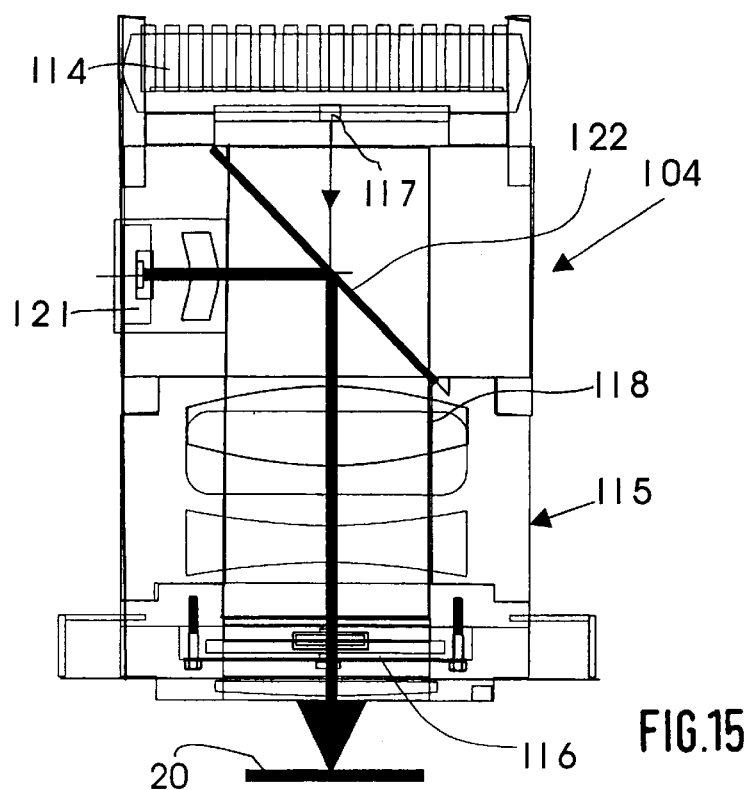
FIG. 15 shows by a longitudinally sectional view like in FIG. 3 an optics with a red-light radiator, an infrared light radiator, and a semitransparent mirror arranged in the path of the light beam.
Figure 16:
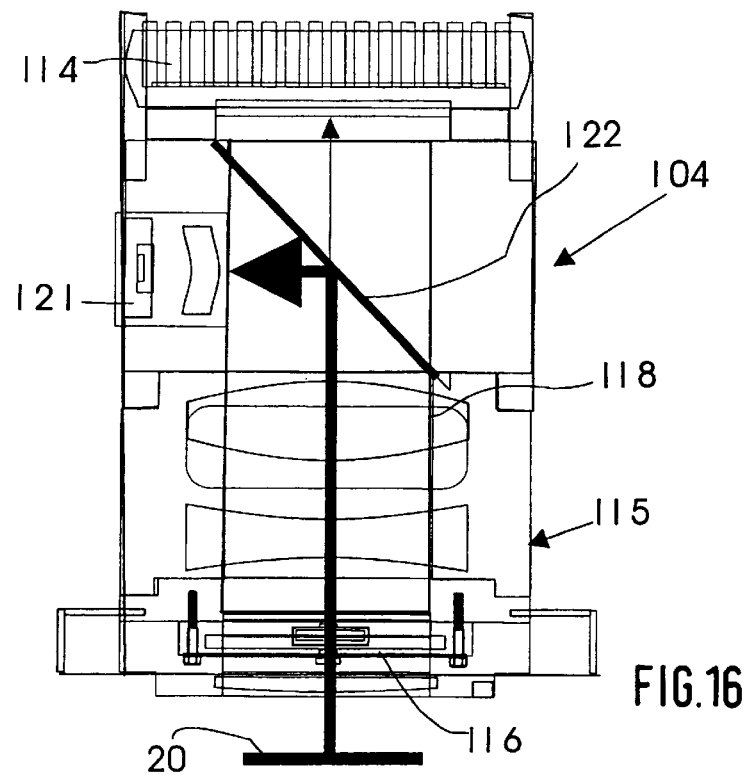
FIG. 16 shows the optics represented in FIG. 15; however, with the path of the light reflected by the selected section.

Reference symbols increased by one hundred versus those used in FIG. 3 are used with the optics shown in FIGS. 15 and 16. Optics 104 again comprises a CCD screen sensor 114, in which an infrared radiator 117 is integrated, and, furthermore, a projection device 115 with a focusing unit 118, which, like focusing unit 18, consists of a biconvex, a plane concave and a biconcave lens, and which has a slotted shutter 116. As opposed to optics 4 shown in FIG. 3, optics 104 is equipped with a red-light radiator 121 arranged at a right angle relative to the path of the rays of infrared radiator 117, as well as with a semi-transparent mirror 122. Mirror 122 is arranged in the path of the rays of infrared radiator 117 and red-light radiator 121 as well and is permeable to the red light laterally emitted by the red-light radiator into the mirror, but impermeable to infrared light.

When a data acquisition device equipped with optics 104 is employed as intended, the infrared light passing through the semitransparent mirror 122, and the laterally inciding red light, which is deflected on the mirror in the direction of the infrared light, radiate through the focusing unit 118 and impact a section of image plane 20 provided with information, such section being freely selectable depending on the adjustment of slotted shutter 116, as this is shown in FIG. 15. The red light with superposed infrared light reflected by section 19 in the direction it is received contains all information of the selected section 19 of image plane 20. The red light component of the reflected light is deflected toward the red light radiator on the semitransparent mirror 122, which is impermeable to said light, whereas the infrared component penetrates through mirror 122 and is received in CCD-image sensor 114, which converts the optical signals contained in the reflected infrared light into electronic signals.

Figure 17:
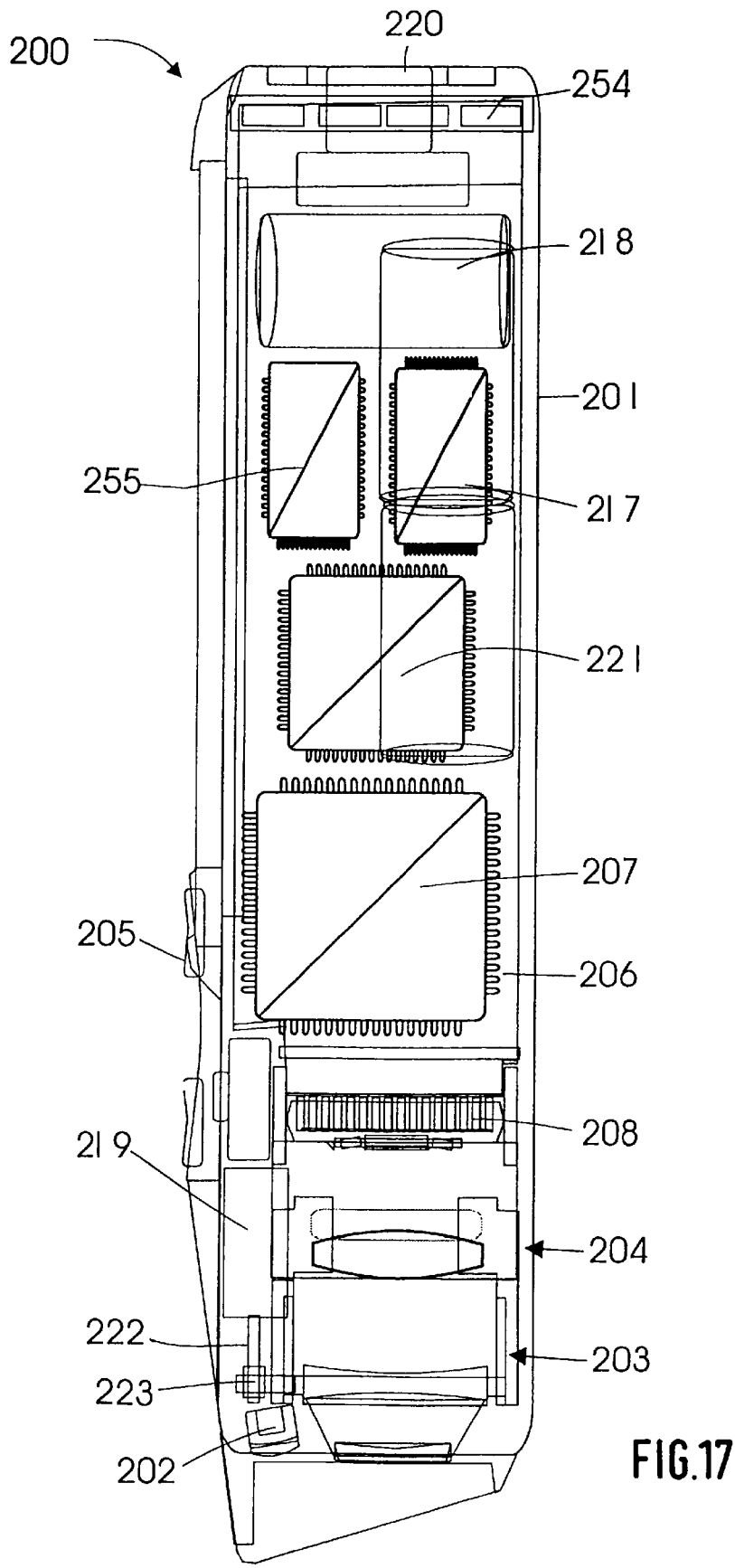
FIG. 17 shows the structure of a data acquisition device of another design with a contact-free motion detector, an adjustable focussing optics, as well as with an input unit.

The data acquisition device 200 shown in FIG. 17 differs from the data acquisition device shown in FIG. 1 in that it comprises a contact-free motion detector 202 integrated in housing 201 instead of the motion detector 2 provided with a scanning sphere 33, and, furthermore, in that it comprises an optics 204 provided with an adjustable focusing unit 203 instead of the non-adjustable optics 4 of data acquisition device 1. Moreover, data acquisition device 200 has an input unit 205 laterally arranged on housing 201. Furthermore, optics 204 is equipped with an image sensor 208, which permits the recording of three-dimensional objects in the manner described in detail below.

The other components of data acquisition device 200 are substantially identical with the corresponding components of data acquisition device 1 in terms of their design and function. For example, data acquisition device 200 also has a board 206 integrated in housing 201 and connected with optics 206, with a signal processing unit 207 and a memory unit 217 arranged on said board as well, and, furthermore, a battery supply unit 218 and an interface 220.

The motion detector shown enlarged in FIG. 18 consists of a scanning head 225, in which there are arranged a semiconductor chip 226 provided with means for detecting the motion as well as the vertical spacing of the data acquisition device from the selected section, as well as a focusing optics which, in the exemplified embodiment shown, is a convex-concave lens 227.

A semiconductor radiator 228 as well as a total of five photodiodes 229, 229', 229", 229''', 230 are integrated in semiconductor chip 226. Photodiodes 229 to 229''' serve in this connection for detecting the movement of data acquisition device 200 parallel with the section 19, whereas photodiode 230 permits the measurement of the vertical spacing of data acquisition device 200 from section 19. The signals emitted by photodiodes 229, 229', 229", 229''' serve in this connection as reference values for a correction-compensation of the read-in data. FIG. 19a shows the intended position of motion detector 202 in the course of the data acquisition process—indicated by arrows—on an image plane 20 marked, only by way of example, with lines of alphanumerical characters 19. In this process, photodiodes 229, 229', on the one hand, and photodiodes 229", 229''' on the other each detect an approximately equally strong signal from the line of alphanumerical characters to be detected. On the other hand, FIG. 19b shows the situation in case the data are not correctly detected in correct conformity with the line of characters. The electric signals emitted by photodiodes 229 and 229' in the course of the reading process distinctly differ in their intensity from the signals of photodiodes 229" and 229'''. The signals of photodiodes 229, 229', 229", 229''' are detected by an evaluation electronics not shown in the figure. In the presence of a predetermined difference of the signal intensity as explained above, the evaluation electronics emits a warning signal, for example a sound signal, until line-correct detection of the alphanumerical information has been re-established. Furthermore, the signals emitted by photodiodes 229, 229', and 229", 229''', respectively, are stored in memory unit 217 and are thus available for later correction/compensation.

Figure 20:
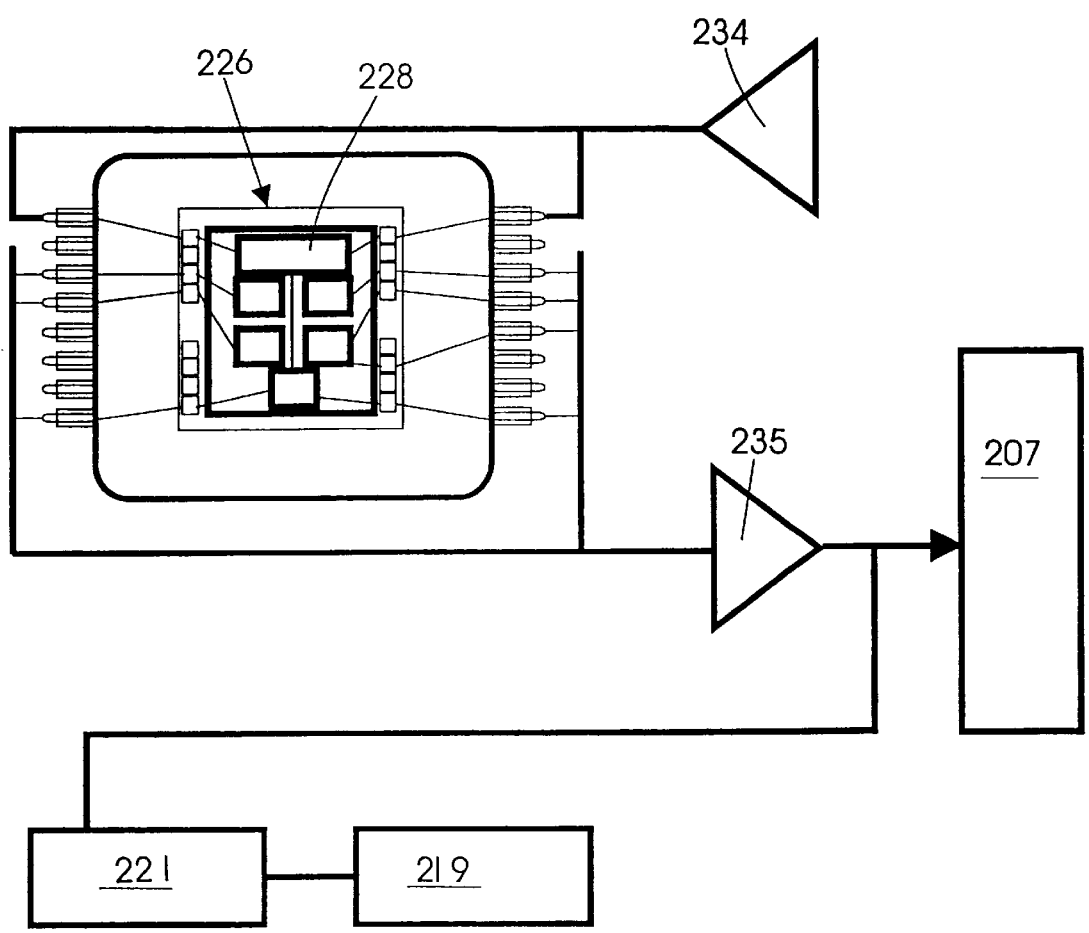
FIG. 20 shows a block diagram for explaining the mode of operation of the motion detector represented in FIGS. 17 and 18.
Figure 21:
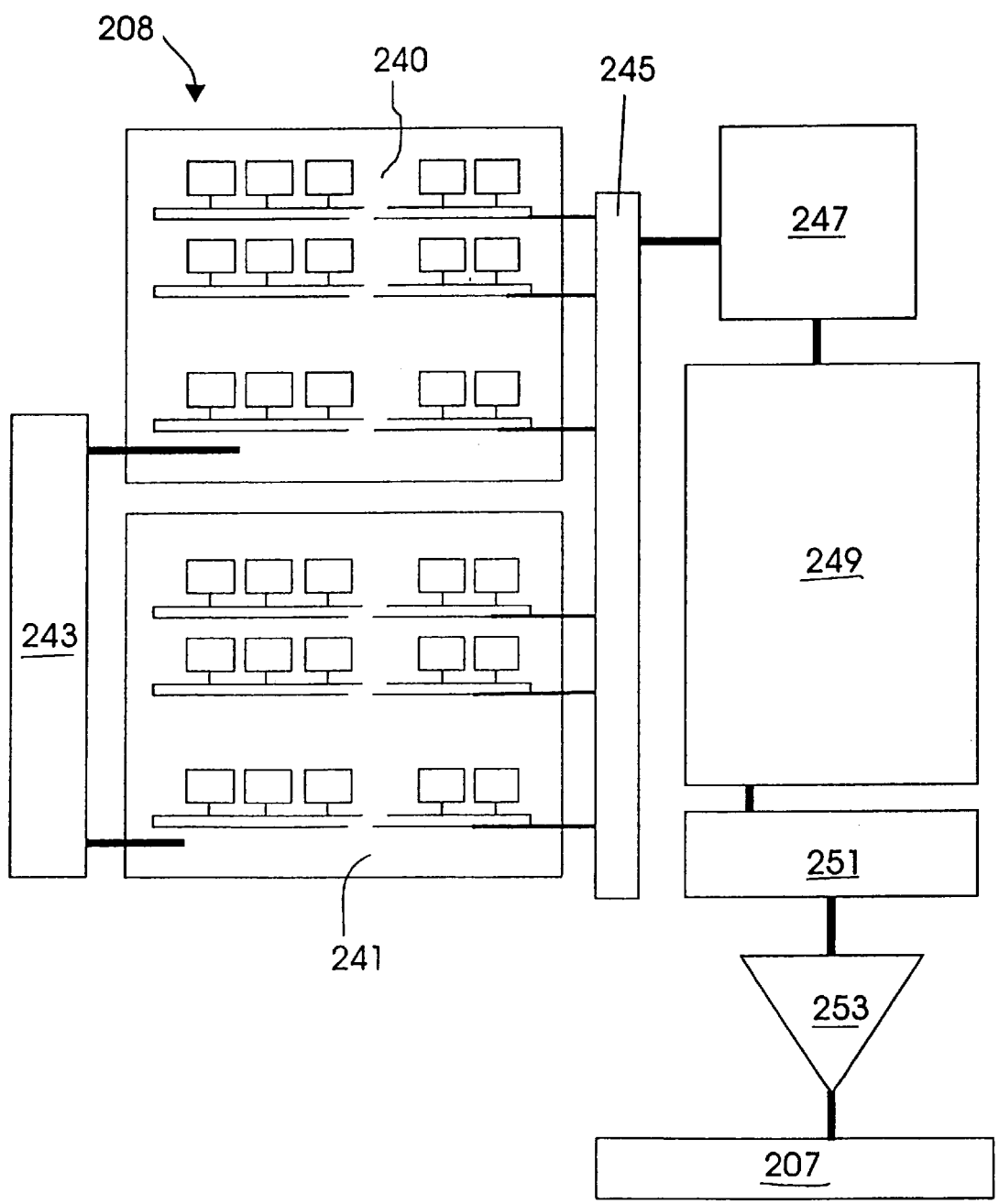
FIG. 21 is a block diagram for explaining the mode of operation of an image sensor for detecting three-dimensional objects.

The contact-free motion detector 202 functions can be described with the help of the block diagram shown in FIG. 20.

Semiconductor 280 is actuated by a suitable control electronics 234 as soon as the read-in process of the data acquisition device starts. The light focused by lens 227 of semiconductor 228 in the direction of the marked surface 20 is reflected by said surface and focused by lens 227 on the semiconductor chip. Photodiodes 229, 229', 229", 229''' detect the reflected light. As data acquisition device 200 moves parallel with the marked surface, a pattern of chronologically successive electric signals is produced in the diode array consisting of photodiodes 229, 229', 229", 229''', based on which pattern it is possible by means of a suitable data processing to determine in a clear manner the direction and the speed of the motion of reading device 200 in the course of the reading process.

The electric pulses of photodiodes 229, 229', 229", 229''', 230 are amplified in an A/D-converter 235 and supplied as digital synchronizing signal to signal processing unit 207 for describing the position of data acquisition device 200 versus the image plane 20. In a similar way as with the signals of Hall element 30 of data acquisition device 1, said synchronizing signals are used for synchronizing the simultaneously recorded electronic image signals of image sensor 208. When the image information of image sensor 298 is filed in memory unit 217, the synchronizing signals are filed as synchronization protocol under the respective memory address of the acquired image information. When calling in the image information with a suitable reproduction device it is possible in this way to obtain at any time a correct and true-to-scale reproduction of the recorded information.

The employment of a contact-free motion detector ensues that when data acquisition device 200 is used as intended, the spacing between reading device 200 and marked surface 20 is variable and not preset in a fixed manner as with reading device 1. For this reason, the focal length of focusing unit 203 is designed adjustable in that part of the lens system of focusing unit 203, namely a biconcave lens in the exemplified embodiment, is displaceably received versus the other components of focusing unit 203, shifting along the optical axis. The focal length is adjusted via a servo-motor 219, which, electronically controlled via a control unit 221, adjusts the focal length in accordance with the information transmitted by motion sensor 202 via the vertical spacing of data acquisition device 200 from marked surface 20. For this purpose, the servo-motor has a driving shaft 222 designed as a threaded spindle, said driving shaft being engaged all around by an eye 223 laterally projecting from the displaceably received lens. The rotational motion of driving shaft 222 is translated in this way into a movement of the lens parallel with the optical axis. Depending on the direction of rotation of driving shaft 222 the focal length of focusing unit 203 is thus increased or reduced.

Image sensor 208 is conceived in such a way that is it capable of detecting the complete information of three-dimensional objects. For this purpose, the image sensor has two detector matrix planes 240, 241, which each detect different ranges of the electromagnetic frequency spectrum not overlapping each other spectrally. Preferably, one of the detector matrix planes has in this connection the full sensitivity for the visible frequency spectrum, whereas the other detector matrix plane 241 detects, for example part of the infrared frequency spectrum.

Detector matrix planes 240, 241 are controlled in a predetermined way in a time-shifted manner by a bistable switch 243. The image information of the two matrix planes 240, 241 is supplied in this way to an image memory 249 via a slide register 245 and an intermediate memory 247. For further processing, in particular for extracting the information about the three-dimensional character of the recorded objects, the information is read out from image memory 249 by means of a slide register 251 and supplied to a signal amplifier 253 of signal processing unit 207.

A transmitter 254 is integrated in housing 201 of data acquisition device 200, which transmitter, instead of wire-supported transmission of the data via interface 220, permits wireless remote data transmission to an external device such as, for example a PC or a notebook.

In signal processing unit 207, the collected data are admitted to further electronic processing and may be directly evaluated in, for example text, chart or graphic programs. Input unit 204 serves in this connection for dialing the respective processing program and to input any additional information, if required. The programs for text- chart and graphics processing are recallably filed in an additional memory 255, in the same way as, for example, reference information for recognizing and translating handwritten information into electronically readable information.

Figure 22:
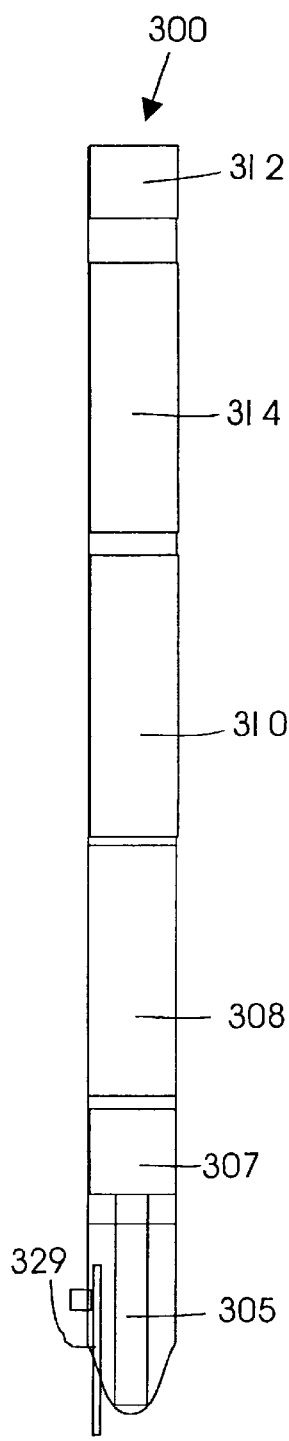
FIGS. 22 to 24 show a data acquisition device of another design, where the devices for reading in-, controlling and indicating each are designed as separate units exchanging data with each other, whereby.
Figure 24:
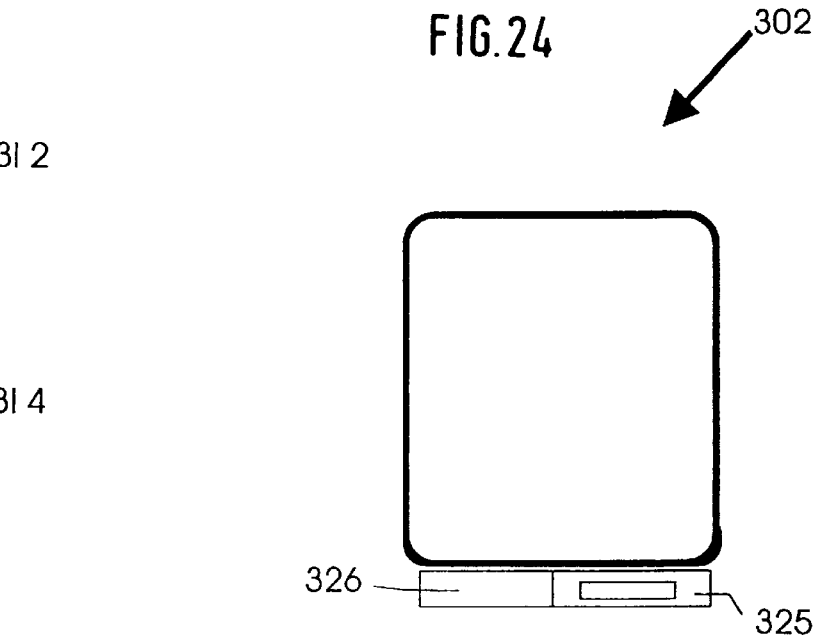
Figure 23:
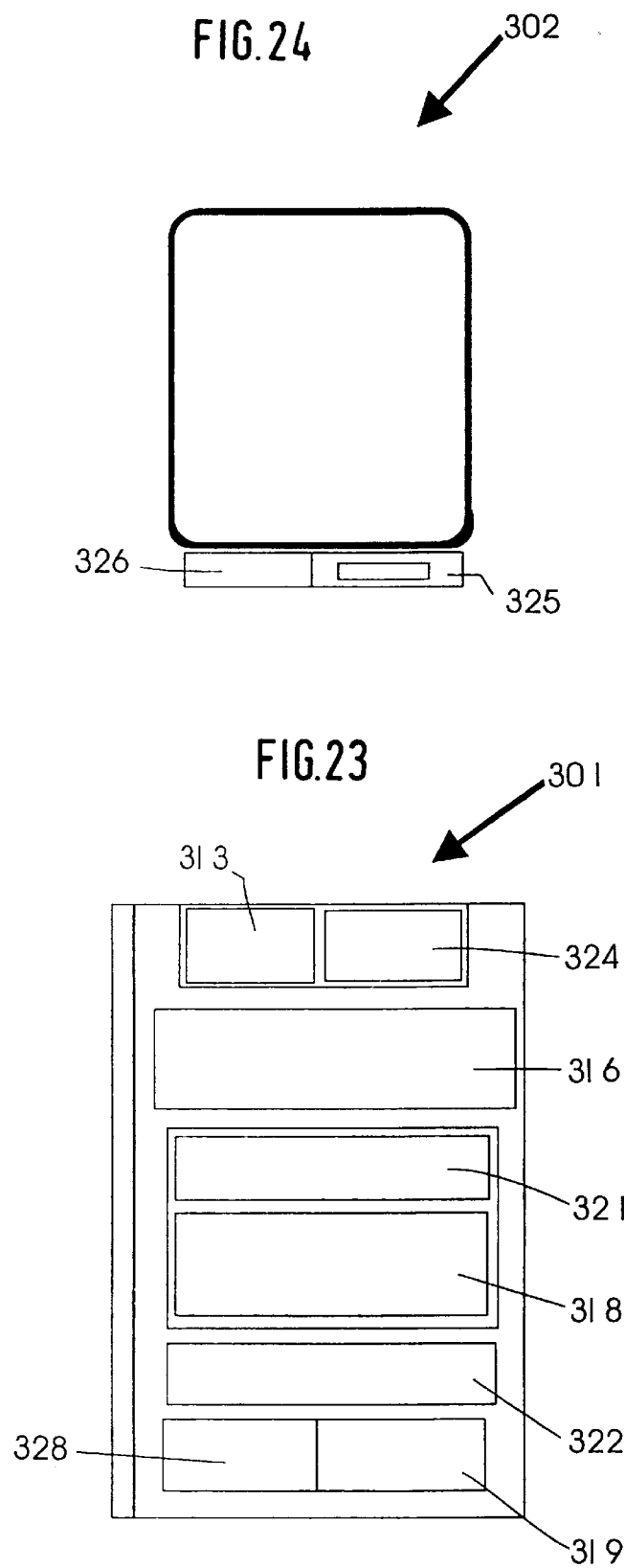

FIGS. 22 to 24 show a data acquisition device of another design, where the devices for reading in, controlling and indicating are designed as separate units 300, 301, 302 exchanging data with each other.

Read-in unit 300, when employed as intended, is directly guided over the image plane 20 marked with alphanumerical, graphic or photographic information. Via a light wave conductor 305, the detected information is supplied to an optics 307, which then reproduces such information on CCD-image sensor 308. In a CCD-signal processing unit 310, the signals detected by image sensor 308 are brought into a form suitable for remote data transmission and supplied to a transmitter 312, which exchanges data with a receiver 313 of control unit 301. Read-in unit 300 is supplied with current by means of its own battery unit 314 and therefore independent of current supply 316 of control unit 301. Read-in unit 300 is at the same time usable as the writing tool. For this purpose, read-in unit 300 has a writing lead 329, which is immersible in read-in unit 300.

In control unit 301, the signals received by receiver 313 are processed in a microprocessor 318. A display 319 serves for indicating the status as well as for indicating error messages, if any. Microprocessor 318 exchanges data with an interface 321 as well as with a graphics interface 322, to each of which external devices such as, for example a PC can be connected via suitable data transmission cables. Direct display of the acquired data and/or of the data processed by microprocessor 318 takes place on display unit 302. Control unit 301 and display unit 302 are connected to each other by means of remote wireless data transmission. For this purpose, control unit 301 has its own transmitter 324, and the display unit has a receiver 325. An electronic processing unit 326 for graphic editing of the data received by receiver 325 is arranged in the display unit.

Control unit 301 is equipped with an input display 328 for keyboardless input with a so-called touch pen. Read-in unit 300, for example, can be considered as touch pen. It is possible in this way to employ the data acquisition device as a keyboardless pocket PC.

What is claimed is:

1. A data acquisition device for optically acquiring and storing alphanumerical characters, graphics and photographic pictures arranged in an image plane, in which a projecting device (15, 115) provided with a radiation source (17, 117) for selecting an image section (19) in the image plane (20) freely selectable within a preset maximum section, projects light onto said section of the picture;

an optical unit (4, 104, 204, 307) captures the light reflected by said image section (19) and reproduces it on a screen sensor (14, 114, 208, 308) converting the light into a sequence of electronic signals;

a motion detector (2, 202) for recording the given position of the data acquisition device (1, 1', 200) converts movements of the data acquisition device (1, 1', 200) within a plane of detection at least approximately parallel with the image plane (20) in any desired direction into synchronizing signals, said direction being variable during the acquisition;

a signal processing unit (7, 207, 318) converts the signals of the screen sensor (14, 114, 208, 308) with the help of the synchronizing signals into character code-independent information packets with retention of the entire originally pictured information of the selected section (19) of the picture, and recallably files said information packets in a memory unit (47, 217) for occasional further electronic processing.

2. The data acquisition device according to claim 1, characterized in that the radiation source consists of at least one semiconductor radiator (17, 117) emitting monochrome light in the visible or ultraviolet spectral range.

3. The data acquisition device according to claim 1, characterized in that the projecting device (15, 115) has a shutter (16, 116), the aperture of which is infinitely adjustable for irradiating differently sized picture sections (19) of image plane (20).

4. The data acquisition device according to claim 3, characterized in that the shutter is designed as a slotted shutter (16, 116), the size of the slot of such shutter being infinitely variable.

5. The data acquisition device according to claim 1, characterized in that the radiation source (17, 117) is integrated in the image sensor (14, 114, 208, 308).

6. The data acquisition device according to claim 1, characterized in that the motion detector (2, 207) is connected in a fixed manner with the data acquisition device.

7. The data acquisition device according to claim 6, characterized in that the motion detector (2) has a rotation symmetrically designed scanning element (33) rotatably supported for turning about at least one axis.

8. The data acquisition device according to claim 7, characterized in that the motion detector (2) has a Hall element (30) with a scanning element (33), whereby the scanning element (33) is surrounded by an inhomogeneous magnetic field (31) in such a way that electric signals are generated in cooperation with the Hall element (30) upon rotation of the scanning element (33), such signals being clearly allocatable to the respective rotary motion.

9. The data acquisition device according to claim 8, characterized in that the scanning element (33) is designed as a sphere arranged freely rotatable in the motion detector (2), said sphere being fitted on the surface with equally spaced magnet platelets (34).

10. The data acquisition device according to claim 1, characterized in that the size of the information packets may in each case be freely determined.

11. The data acquisition device according to claim 1, characterized in that the memory unit (47, 217) consists of one or a plurality of memories (49, 57) integrated in the signal processing unit (7, 207).

12. The data acquisition device according to claim 11, characterized in that the signal processing unit (7, 207, 318) has devices for additionally connecting external memories (57).

13. The data acquisition device according to claim 1, characterized in that the image sensor (14, 114, 208, 318) is equipped with integrated memories for signal processing.

14. The data acquisition device according to claim 1, characterized in that the signal processing device (7, 207, 318) and/or the memory unit (47, 217) are optically, electronically or optoelectronically connected to an interface (10, 220, 321) for transmitting data to external equipment.

15. The data acquisition device according to claim 1, characterized by an integrated battery current supply (8, 218, 314, 316), said supply being operatable with rechargeable batteries (9).

16. The data acquisition device according to claim 15, characterized in that an integrated charging electronics for recharging batteries permits electronically controlled rapid charging of the batteries (9).

17. The data acquisition device according to claim 15, characterized in that the charging electronics is integrated in the interface (10).

18. The data acquisition device according to claim 15, characterized in that the current infeed for charging the batteries (9) takes place via a slide-in device (62) detachable from the data acquisition device.

19. The data acquisition device according to claim 14, characterized in that the interface (10, 220, 321) is connectable to an interface cable via which feeding of current for charging the batteries (9) is possible.

20. The data acquisition device according to claim 1, characterized in that a signal processing chip for controlling an externally connectable monitor (81) is integrated in the signal processing unit (7, 207, 318), with the information packets generated in the signal processing unit (7, 207) being visually displayable via said monitor.

21. The data acquisition device according to claim 20, characterized in that the monitor is a slide-in unit (80, 81) connected with the data acquisition device in a fixed yet detachable manner.

22. The data acquisition device according to claim 20, characterized in that the signal processing chip has an access possibility for visually displaying stored information packets on the monitor (81, 302).

23. The data acquisition device according to claim 1, characterized by the design as a hand-held device.

24. The data acquisition device according to claim 23, characterized in that the hand-held device is designed in the way of a fountain pen.

25. The data acquisition device according to claim 1, characterized in that an infrared radiator integrated in the image sensor (114) serves as the radiation source (117); and the projecting device (115) of a light source (121) radiating visible light perpendicular to the direction of radiation of the infrared radiator (117) and having a semitransparent mirror (122) permeable to infrared light, reflects visible light, whereby the semitransparent mirror (122) in mounted in the ray paths of the infrared light and the visible light in such a way that the light emitted by the infrared radiator (117) and the visible light of the light source (121) illuminate a congruent image section (19) of the image plane (20), on the one hand, and only the infrared component of the light reflected by this image section (19) is received on the image sensor (114), on the other hand, whereas the visible component of the reflected light is guided in a direction away from the image sensor.

26. The data acquisition device for optically acquiring and storing alphanumerical characters, graphics and photographic pictures and/or three-dimensional topographies arranged in the plane of a picture in which a projecting device (15, 115) provided with a radiation source (17, 117, 228) for selecting a freely selectable section (19) of the image plane or topography within a preset maximum section, projects light onto said section (19);

an optical unit (4, 104, 204, 307) captures the light reflected by said section (19) and reproduces it on a screen detector (14, 114, 208, 308) converting the light into a sequence of electronic signals;

a motion detector (2, 202) for recording the given position of the data acquisition device is provided with detecting means (229, 229', 229", 229'") for contactless detection of the movements of the data acquisition device (1, 200) in any desired direction, said direction being variable during acquisition, and converts the given movement of the data acquisition device (1, 200) into synchronizing signals;

a signal processing unit (7, 207, 318) converts the signals of the screen sensor (14, 114, 208, 308) with the help of the synchronizing signals into character code-independent information packets with retention of the entire original information of the section (19) and recallably files said information packets in a memory unit for occasional further electronic processing.

27. The data acquisition device according to claim 26, characterized in that as detecting means for detecting a plane of acquisition substantially parallel with the image plane (20), provision is made for photodiodes (229, 229', 229", 229''') arranged spaced from each other in at least two directions, said photodiodes detecting the light reflected by the selected section (19) and converting it into electronic information applicable as reference information for carrying out a correction/compensation.

28. The data acquisition device according to claim 27, characterized in that the motion detector (2, 202) has means (230) for detecting the vertical spacing between the data acquisition device (1, 200) and the selected section (19), for example a photodiode detecting light of the radiation source (17, 117, 228) reflected by the section (19).

29. The data acquisition device according to claim 27, characterized in that the means (230) for detecting the vertical spacing are actively connected with a servo-drive (219), by means of which the focal length of the focusing unit (18, 118, 203) of the data acquisition device (1, 200) is adjustable in a predetermined way depending on the vertical spacing.

30. The data acquisition device according to claim 27, characterized in that as radiation source (228) for detecting the movement and/or the vertical spacing provision is made for a semiconductor radiator integrated in the motion detector (202).

31. The data acquisition device according to claim 26, characterized in that the means (229, 229', 229", 229''') for detecting the m-movement and/or the means (230) for detecting the vertical spacing and/or the radiation source (228) for detecting the motion are integrated in a microchip (226) arranged in the motion detector (2, 202).

32. The data acquisition device according to claim 26, characterized in that the means (229, 229', 229", 229''') for detecting the motion and/or the means (230) for detecting the vertical spacing emit synchronizing signals which are storable in the memory unit (7, 207) in a synchronization protocol allocated to the respective information packet (51).

33. The data acquisition device according to claim 1, characterized in that the image sensor (14, 114, 208, 308) for detecting the three-dimensional nature of objects of the selected section (19) is provided with two detector matrix planes (240, 241) for detecting two different spectral regions of an electromagnetic overall frequency spectrum not overlapping each other, whereby the two detector matrix planes are successively controlled time-shifted in a predetermined manner.

34. The data acquisition device according to claim 1, characterized by a transmitting and receiving unit (254) for wireless remote data transmission to an external computer.

35. The data acquisition device according to claim 1, characterized in that the signal processing unit (7, 207, 318) exchanges data with a memory medium (254) in order to convert hand-written information with the help of reference information into EDP-readable information, preferably into hexadecimal characters.

36. The data acquisition device according to claim 1, characterized by an input unit (205) by means of which it is possible to input information about selectable processing programs such as text, chart or graphics programs.

37. The data acquisition device according to claim 1, characterized by a read-in unit (300), a control unit (301) and/or a display unit (302) each being designed as functionally autonomous units and exchanging data with each other preferably wirelessly, directly or indirectly.

38. The data acquisition device according to claim 37, characterized in that the control unit (301) is equipped with sensor means (328) for the input of data.

39. The data acquisition device according to claim 37, characterized in that the read-in unit (300) is equipped with means for writing (329), for example with a writing lead imm ersible in the read-in unit (300).

* * * * *